United States Patent
Jo et al.

(10) Patent No.: US 12,534,102 B2
(45) Date of Patent: Jan. 27, 2026

(54) METHOD AND SYSTEM FOR ASSISTING DRIVING ON FAILING DRIVER ASSISTANCE FUNCTION

(71) Applicant: HL Klemove Corp., Incheon (KR)

(72) Inventors: Eunsan Jo, Pyeongtaek-si (KR); Dogyun Kim, Pyeongtaek-si (KR)

(73) Assignee: HL KLEMOVE CORP., Incheon (KR)

( * ) Notice: Subject to any disclaimer, the term of this patent is extended or adjusted under 35 U.S.C. 154(b) by 34 days.

(21) Appl. No.: 18/679,761

(22) Filed: May 31, 2024

(65) Prior Publication Data
US 2025/0187624 A1    Jun. 12, 2025

(30) Foreign Application Priority Data
Dec. 12, 2023   (KR) .................. 10-2023-0179512

(51) Int. Cl.
*B60Q 1/00* (2006.01)
*B60W 30/09* (2012.01)
(Continued)

(52) U.S. Cl.
CPC ............ *B60W 50/16* (2013.01); *B60W 30/09* (2013.01); *B60W 30/0956* (2013.01);
(Continued)

(58) Field of Classification Search
CPC .. B60W 50/16; B60W 30/09; B60W 30/0956; B60W 30/12; B60W 50/0205; B60W 50/029; B60W 2050/143; B60W 2050/146; B60W 2420/403; B60W 2420/408; B60W 2510/202;
(Continued)

(56) References Cited

U.S. PATENT DOCUMENTS 10,249,108 B2 * 4/2019 Schroeder ............ G07C 5/0808
12,179,804 B2 * 12/2024 Jeon ..................... G06V 20/58
(Continued)

FOREIGN PATENT DOCUMENTS

JP    2005-88890 A    4/2005
JP    2023-550017 A    11/2023

OTHER PUBLICATIONS

Office Action issued on Nov. 24, 2025, for corresponding Korean Patent Application No. 10-2023-0179512, along with an English machine translation (14 pages).

*Primary Examiner* — Toan N Pham
(74) *Attorney, Agent, or Firm* — Hauptman Ham, LLP

(57) ABSTRACT

A method for assisting driving on failing the driver assistance function of the vehicle according to an embodiment of the present disclosure comprises: detecting a failure of the driver assistance function; generating a plurality of driving route candidates based on a driving state when the driver assistance function fails; determining a driving risk of the vehicle for each of the plurality of driving route candidates; determining an appropriate response action of a driver for minimizing the driving risk of the vehicle, based on the driving risk for each of the plurality of driving route candidates; determining whether the driver took the appropriate response action; and performing a driving assistance in a direction of minimizing the driving risk of the vehicle if it is determined that the driver did not take the appropriate response action.

20 Claims, 8 Drawing Sheets

(51) Int. Cl.
   *B60W 30/095*   (2012.01)
   *B60W 30/12*    (2020.01)
   *B60W 50/02*    (2012.01)
   *B60W 50/029*   (2012.01)
   *B60W 50/16*    (2020.01)
   *B60W 50/14*    (2020.01)

(52) U.S. Cl.
   CPC ........ *B60W 30/12* (2013.01); *B60W 50/0205* (2013.01); *B60W 50/029* (2013.01); *B60W 2050/143* (2013.01); *B60W 2050/146* (2013.01); *B60W 2420/403* (2013.01); *B60W 2420/408* (2024.01); *B60W 2510/202* (2013.01); *B60W 2540/18* (2013.01); *B60W 2552/53* (2020.02)

(58) Field of Classification Search
   CPC ......... B60W 2540/18; B60W 2552/53; B60W 2710/202; B60W 10/20; B60W 50/14; B60W 60/0059; B60W 40/02; B60W 40/08
   See application file for complete search history.

(56) References Cited

U.S. PATENT DOCUMENTS

| | | | |
|---|---|---|---|
| 12,384,390 B2 * | 8/2025 | Yang | B60W 30/045 |
| 2025/0074464 A1 * | 3/2025 | Oboril | B60K 35/28 |

* cited by examiner

METHOD AND SYSTEM FOR ASSISTING DRIVING ON FAILING DRIVER ASSISTANCE FUNCTION

CROSS-REFERENCE TO RELATED APPLICATION

This application claims the benefit of and priority to Korean Patent Application No. 10-2023-0179512, filed on Dec. 12, 2023, the entire disclosures of which are incorporated herein by reference.

TECHNICAL FIELD

The present disclosure relates to a method and system for assisting driving on failing a driver assistance function. More specifically, the present disclosure relates to a method and system for assisting driving for performing a warning and an assist control such that the driver promptly minimizes the driving risk when the driver assistance function of the vehicle fails.

BACKGROUND

In a vehicle, a driver assistance system provides assistance to the driver while driving in the vehicle for the driver's convenience.

For example, among the driver assistance functions of the driver assistance system, the lane keeping function refers to a function that assists the driver to drive with maintaining the driving lane when driving the vehicle.

On the other hand, if the lane keeping function fails in a vehicle equipped with a driver assistance system, the driving authority is transferred from the system to the driver. When the authority is transferred to the driver, the driver should quickly take an appropriate action. If not, dangerous situations such as departing from the lane or colliding with surrounding vehicles may occur.

Meanwhile, according to the prior art, it is common to issue a warning not at the timing when the driver assistance function fails, but at the timing a dangerous situation occurs while the driver is driving after taking over the authority from the system.

However, if the warning is issued at the timing the dangerous situation occurs, it may be delayed to respond to the dangerous situation, and with only a simple visual or audible warning, it is difficult for the driver to immediately recognize the direction to avoid the risk. Thus, there is a problem that there is a high risk of accidents.

Therefore, when the driver assistance function of the vehicle fails, there is a need for a method and system for assisting driving that can provide a warning and an assistance so that the driver taking over the driving authority can promptly take response actions to minimize the risk.

SUMMARY

The present disclosure is to solve the above-mentioned problems of the prior art, and the object of the present disclosure is to provide a method and system for assisting driving that promptly performs the warning and the assist control to minimize the driving risk when the driver assistance function of the vehicle fails.

However, the technical problem to be achieved by the embodiments of the present disclosure is not limited to the technical problems described above, and other technical problems may exist.

As a technical means for achieving the above technical problem, a method for assisting driving on failing a driver assistance function of a vehicle according to an embodiment of the present disclosure comprises: detecting a failure of the driver assistance function; generating a plurality of driving route candidates based on a driving state when the driver assistance function fails; determining a driving risk of the vehicle for each of the plurality of driving route candidates; determining an appropriate response action of a driver for minimizing the driving risk of the vehicle, based on the driving risk for each of the plurality of driving route candidates; determining whether the driver took the appropriate response action; and performing a driving assistance in a direction of minimizing the driving risk of the vehicle if it is determined that the driver did not take the appropriate response action.

Further, the performing of the driving assistance may comprise issuing a warning in the direction of minimizing the driving risk of the vehicle, and performing an assist control in the direction of minimizing the driving risk of the vehicle.

Further, the driver assistance function may be a lane keeping function that assists the vehicle to maintain a driving lane, and the generating of the plurality of driving route candidates may comprise generating a plurality of driving route candidates comprising a first driving route candidate according to a steering angle of the vehicle on failing the lane keeping function, a second driving route candidate in which the steering angle is shifted to left by a predetermined angle from the first driving route candidate, and a third driving route candidate in which the steering angle is shifted to right by the predetermined angle from the first driving route candidate.

Further, the determining of the driving risk of the vehicle may comprise determining the driving risk of the vehicle based on whether the vehicle is departed from a lane line of the driving lane or whether the vehicle is following a center of the driving lane if the lane line exists between the driving lane and an adjacent lane.

Further, the determining of the driving risk of the vehicle may comprise determining the driving risk of the vehicle by determining a collision risk with a peripheral vehicle if there is no lane line between the driving lane of the vehicle and a lane in which the peripheral vehicle is driving.

Further, the warning in the direction of minimizing the driving risk of the vehicle may be at least one of a visual warning or an audible warning.

Further, the visual warning may be performed by displaying a steering direction of the driver for minimizing the driving risk of the vehicle on a cluster or a head-up display of the vehicle.

Further, the audible warning may be performed by generating a warning sound from an opposite direction to a steering direction of the driver for minimizing the driving risk of the vehicle.

The method for assisting driving may further comprise: after issuing the warning in the direction of minimizing the driving risk of the vehicle, determining whether the driver took the appropriate response action within a predetermined time, and the assist control may be performed if the driver did not perform the appropriate response action within the predetermined time.

Further, the predetermined time may be set differently depending on the driving risk of the vehicle when the driver assistance function fails.

Further, the assist control may be a steering assist control that rotates a steering wheel of the vehicle in the direction of minimizing the driving risk of the vehicle, and an assist torque during the steering assist control may be set to be gradually decreased over time after a predetermined torque application time has elapsed after an initial assist torque is applied.

A system for assisting driving of a vehicle according to an embodiment of the present disclosure comprises: a sensor configured to detect surroundings of the vehicle; a driver assistance function status detector configured to detect a status of a driver assistance function of the vehicle; a vehicle information detector configured to detect body information of the vehicle; and a controller configured to control to perform driving assistance when a failure of the driver assistance function of the vehicle is detected, wherein the controller is configured to: generate a plurality of driving route candidates based on a driving state when the driver assistance function fails; determine a driving risk of the vehicle for each of the plurality of driving route candidates; determine an appropriate response action of a driver for minimizing the driving risk of the vehicle, based on the driving risk for each of the plurality of driving route candidates; determine whether the driver took the appropriate response action; and perform a driving assistance in a direction of minimizing the driving risk of the vehicle if it is determined that the driver did not take the appropriate response action.

Further, the sensor the sensor may comprise at least one of a front camera, a front radar, or a plurality of corner radars installed at the vehicle.

The system for assisting driving of the vehicle may further comprise: a warning apparatus configured to warn the driver; and a steering apparatus configured to control a lateral movement of the vehicle, and the driver assistance function may be a lane keeping function that assists the vehicle to maintain a driving lane.

Further, the warning apparatus may be configured to perform the driving assistance by performing at least one of a visual alarm, an audible alarm, or a haptic alarm in the direction of minimizing the driving risk of the vehicle.

Further, the warning apparatus may comprise a visual alarm device and the visual alarm device comprises at least one of a cluster or a head-up display, and the visual alarm may be performed by displaying a steering direction of the driver for minimizing the driving risk of the vehicle on at least one of the cluster or the head-up display.

Further, the warning apparatus may comprise an audible alarm device, and the auditory alarm may be performed by generating a warning sound by the audible alarm device located in an opposite direction to a steering direction of the driver for minimizing the driving risk of the vehicle.

Further, the warning apparatus may comprise a haptic alarm device, and the haptic alarm may be performed by generating vibration on one side of a steering wheel corresponding to the direction of minimizing the driving risk of the vehicle.

Further, the controller may be configured to perform control so that an assist torque is applied to the steering apparatus, and the assist torque is applied in the direction of minimizing the driving risk of the vehicle.

Further, the controller may be configured to control the assist torque to be gradually decreased over time after a predetermined torque application time has elapsed after an initial assist torque is applied.

The above-described means for solving the problem is only exemplary and should not be construed as limiting the present disclosure. In addition to the exemplary embodiments described above, additional embodiments may exist in the drawings and the following detailed description of the present disclosure.

According to certain embodiments of the present disclosure, it is possible to provide a method and system for assisting driving that can proactively respond to dangerous situations by promptly providing alarms and assists for minimizing the risk to the driver, when the driver assistance function fails.

In addition, according to embodiments of the present disclosure, it is possible to provide a method and system for assisting driving that can increase driving convenience by promptly disarming unnecessary alarms if the driver responds appropriately in the event of the driver assistance function failure.

However, the effects obtainable from the present disclosure are not limited to the effects described above, and other effects may exist.

DETAILED DESCRIPTION

Figure 1:
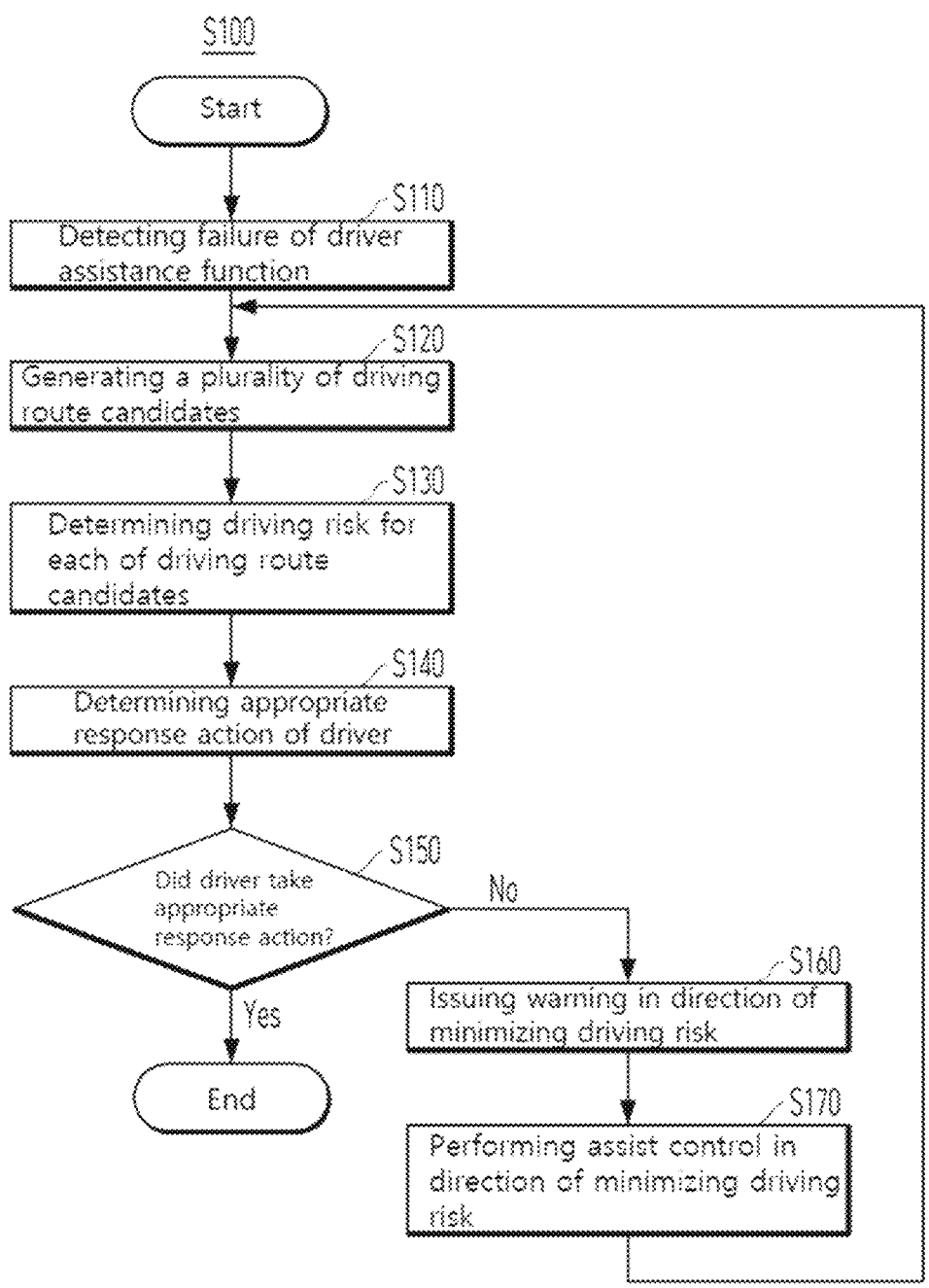
FIG. 1 is a control flowchart showing a method for assisting driving on failing a driver assistance function according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for assisting driving that promptly performs an alarm and an assist control in a direction that minimizes the risk when the driver assistance function fails.

FIG. 1 is a control flowchart showing a method for assisting driving on failing a driver assistance function according to an embodiment of the present disclosure.

Referring to FIG. 1 of the present disclosure, the method for assisting driving on failing the driver assistance function S100 according to the embodiment of the present disclosure may comprise a step of detecting the failure of the driver assistance function S110.

For example, the driver assistance function may be a lane keeping function. Specifically, when driving on a curved lane with a large curvature or on a road where one lane line is not detected, the lane keeping function may fail, and in this case, a very dangerous situation may occur for the driver.

In this regard, it may be determined that the lane keeping function fails if the lane line is not recognized or the lane width is too narrow (e.g., if the lane width is less than 2.5 m) or too wide (e.g., if the lane width is greater than 4.5 m). Otherwise, if the absolute value of the roadway curvature is large (e.g., the roadway curvature is greater than 0.008 m$^{-1}$ (125R)), if the absolute value of the lateral acceleration is large (e.g., greater than 2.8 m/s$^2$), if the longitudinal deceleration is large (e.g., greater than 4.0 m/s$^2$) or if the steering torque value is large (e.g., greater than 5 Nm), the lane keeping function may fail.

Further, according to the embodiment of the present disclosure, if the failure of the driver assistance function during the driving of the vehicle is detected, a step of generating a plurality of driving route candidates for the driving vehicle S120 may be performed.

For example, when the lane keeping function fails, the plurality of driving route candidates may comprise routes corresponding to steering angles shifted by a predetermined angle to the left and to the right with respect to the steering angle on failing the lane keeping function.

Specifically, when the lane keeping function fails, the plurality of driving route candidates may comprise three driving route candidates including a first driving route which is an expected route in case that the steering angle on failing the lane keeping function is maintained, a second driving route which is an expected route in case that the steering angle is shifted from the steering angle on failing the lane keeping function to the left by a predetermined angle, and a third driving route which is an expected route in case that the steering angle is shifted from the steering angle on failing the lane keeping function to the right by a predetermined angle.

However, it is not limited thereto, and plurality of driving route candidates may comprise 5, 7 or more driving route candidates as needed. For example, the route in which the steering angle is further shifted to the left by a predetermined angle from the second driving route may be set as a fourth driving route, and the route in which the steering angle is further shifted to the right by a predetermined angle from the third driving route may be set as a fifth driving route. Thus, the plurality of driving route candidates may comprise five driving route candidates from the first to fifth driving routes.

Here, the predetermined angle may be approximately from 1 to 2 degrees, but it is not limited thereto and may be set differently as needed. Preferably, in situations where the risk is high (for example, when the curvature of a curved lane is large), the predetermined angle may be set to be small to accurately determine the optimal driving route, and in situations where the risk is relatively low, the predetermined angle may be set to be large.

After generating a plurality of driving route candidates, a driving risk determination step S130 may be performed in which the driving risk is determined for each driving route candidate.

Specifically, in case that there exists driving lane lines, the driving risk for a driving route candidate is determined by determining whether the vehicle is driving along the center of the driving lane, or whether the vehicle will depart from the driving lane at a predetermined distance ahead if the vehicle drives along the corresponding driving route candidate.

Such determination of the lane center following and/or the lane departure may be performed, for example, by a front camera installed at the vehicle.

Meanwhile, the driving risk of the vehicle if there is no lane line may be determined through the collision risk with peripheral vehicles.

First, by predicting the future driving route of the host vehicle based on the driving speed and the direction of the host vehicle, and by predicting the future driving route of the peripheral vehicle based on the driving direction and the driving speed of the peripheral vehicle detected by the sensor unit of the host vehicle, the intersection point between the host vehicle and the peripheral vehicle may be determined as the expected collision location, and the collision risk may be determined based on the expected collision time (TTC; Time To Collision) to the expected collision location.

Alternatively, the collision risk of the vehicle may be determined by estimating the driver's intention to yield of the peripheral vehicle and reflecting the intention. Specifically, the driver's intention to yield when the peripheral vehicle approaches the expected collision location may be estimated by using an intelligent driver model (IDM), and based on the driver's intention to yield, if the expected time to collision (TTC) exists within the time range between the minimum arrival time and the maximum arrival time, it may be determined that there is a collision risk.

After evaluating the driving risk for each driving route candidate as described above, a response action determination step S140 may be performed to determine the driver's appropriate response action for minimizing the driving risk of the vehicle.

For example, if a plurality of driving route candidates including a route that changes the steering angle to the left or the right by a predetermined angle are generated due to a failure of the lane keeping function, it may be determined the driver's appropriate response action regarding that if which driving route is selected, the driving risk of the vehicle can be minimized.

By determining the driver's appropriate action in advance, it is possible to promptly determine whether the driver's subsequent action is appropriate.

Subsequently, a driver action determination step S150 may be performed to determine whether the driver actually performed the appropriate response action (whether the appropriate response action for minimizing the driving risk has been taken). For example, when the driver turns the steering wheel at a steering angle for minimizing the driving risk among a plurality of driving route candidates, it may be determined that the appropriate response action has been taken.

If it is determined that the driver has responded appropriately to minimize the driving risk ('Yes' in S150), the driving assistance method according to the embodiment of the present disclosure may be terminated. However, if it is determined that the driver did not respond appropriately ('No' in S150), a driving assistance step may be performed to provide driving assistance in a direction of minimizing the driving risk of the vehicle.

Specifically, the driving assistance step may include a warning step S160 that generates an alarm in the direction of minimizing the driving risk of the vehicle, and an assist step S170 that performs an assist control in the direction of minimizing the driving risk of the vehicle.

More specifically, the warning step S160 may be performed by a visual alarm or an audible alarm. Additionally, the assist step S170 may be performed by a steering assist that rotates the steering wheel at the steering angle for minimizing the driving risk by the system. More specific driving assistance methods will be discussed in the description of FIGS. 6A to 7B.

According to the embodiment of the present disclosure as described above, when the driver assistance function fails, a plurality of driving route candidates may be generated, the driving risk for each driving route candidate may be evaluated, and then the driver's action to minimize the driving risk may be predetermined. By doing so, it is possible to promptly determine whether the driver has taken appropriate actions and to provide driving assistance in the direction that minimizes the driving risk.

Figure 2:
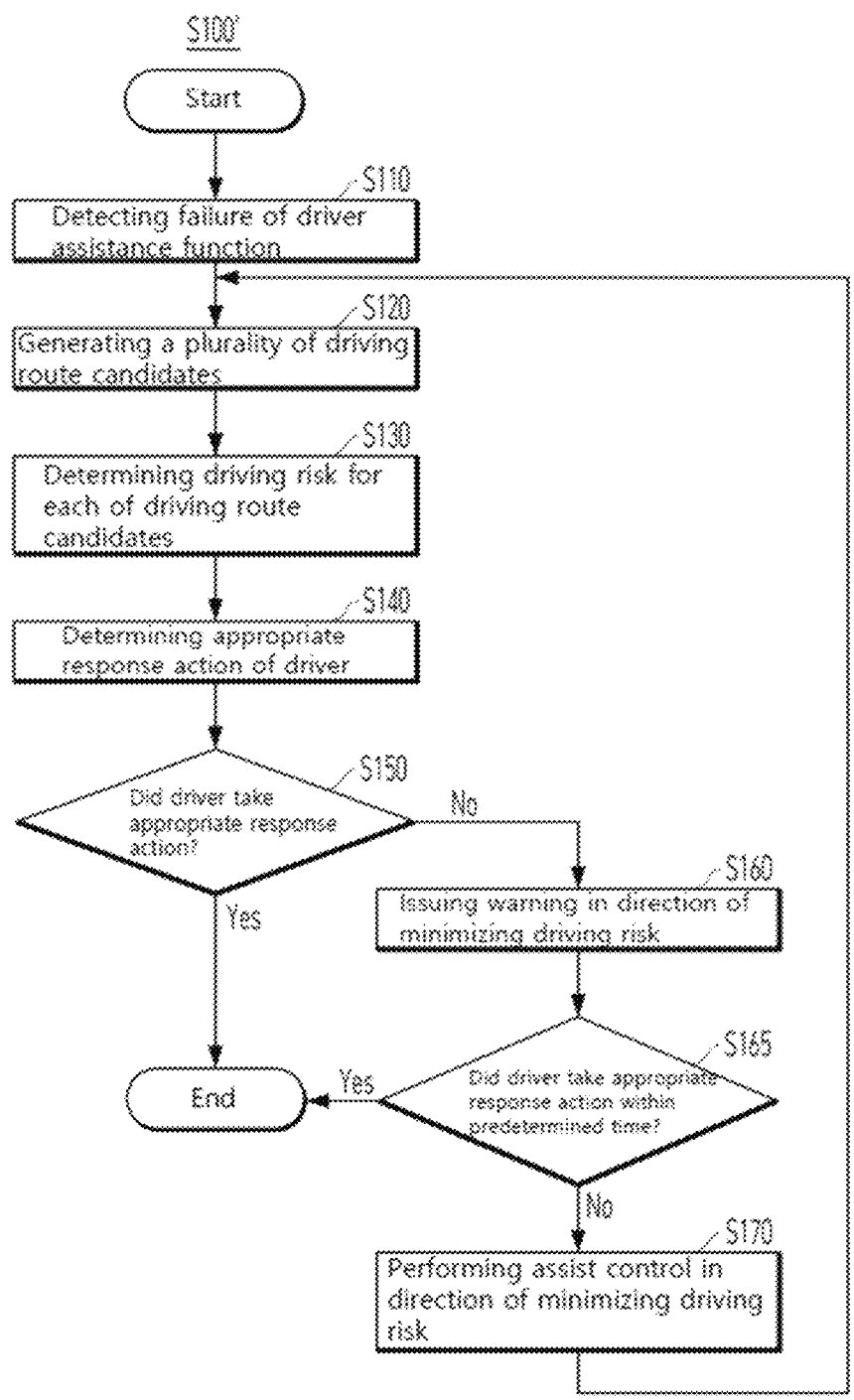
FIG. 2 is a control flowchart showing a method for assisting driving on failing a driver assistance function according to another embodiment of the present disclosure.

FIG. 2 is a control flowchart showing a method for assisting driving on failing a driver assistance function according to another embodiment of the present disclosure.

Compared to the embodiment of FIG. 1, the embodiment of FIG. 2 of the present disclosure has a difference in that, in the driving assistance step, a determination step S165 is additionally performed between the warning step S160 and the assist control step S170 for determining whether the driver responded appropriately within a predetermined time.

If the driver responds appropriately within the predetermined time ('Yes' in S165), the driving assistance method according to the embodiment of the present disclosure may be terminated, and if the driver does not respond appropriately within the predetermined time ('No' in S165), the assist control step S170 may be performed.

On the other hand, the predetermined time may be set differently in case that the driving risk is high and in case that the driving risk is relatively low. In this regard, if the driving risk is high, the predetermined time may be set to be short (the assist control is performed immediately after the warning), and if the driving risk is low, the predetermined time may be set relatively long (for example, 1 to 2 seconds).

In other words, if the driving risk is high, the assist control may be performed promptly after issuing a visual or audible warning, and if the driving risk is relatively low, the assist control is performed after waiting for the driver's action for a certain period of time. Accordingly, it is possible to prevent the driver from being disturbed by a sudden assist control (generation of steering torque) in a situation where the driving risk is relatively low.

Figure 3:
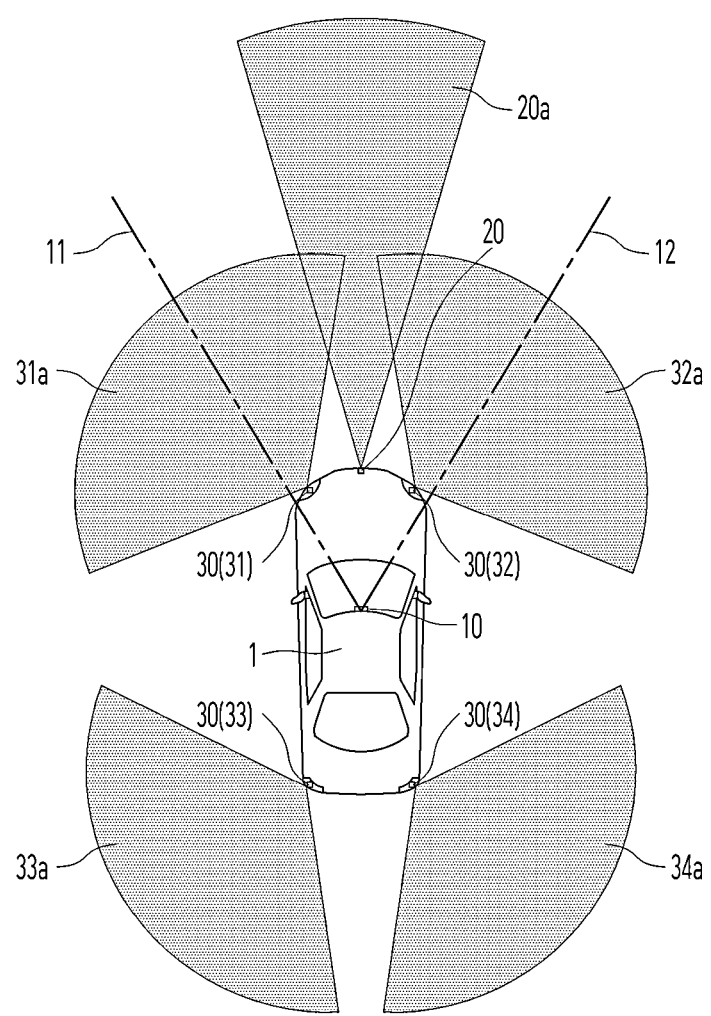
FIG. 3 is a diagram showing a camera and radars installed at a vehicle according to the embodiments of the present disclosure.

FIG. 3 is a diagram showing a camera and radars installed at a vehicle according to the embodiments of the present disclosure.

As shown in FIG. 3, the front camera 10 may be installed at the windshield of the vehicle and may have a field of view having a viewing angle formed by a left visual limit line 11 and a right visual limit line 12.

The front camera 10 may collect image data from the front of the vehicle 1 by photographing the front of the vehicle 1. The front camera 10 may include a plurality of lenses and image sensors, and the image sensor may include a plurality of photo diodes that convert light into electrical signals.

The front radar 20, which may be installed at a grill or a bumper at the front of the vehicle 1, may include a transmitting antenna that transmits radio waves toward the front and a receiving antenna that receives reflected radio waves reflected by an object in front. Further, data may be obtained from the transmitted radio wave transmitted by the transmitting antenna and the reflected radio wave received by the receiving antenna. The front radar 20 may have a detection area 20a at the front of the vehicle 1, and detection data by the front radar 20 may include distance information and relative speed information with respect to an object in front.

A plurality of corner radars (30; 31 to 34) may be provided at the corners of the vehicle 1. Specifically, the plurality of corner radars may include a first corner radar 31 installed at the front left side of the vehicle 1, a second corner radar 32 installed at the front right side of the vehicle 1, a third corner radar 33 installed at the rear left side of vehicle 1, and a fourth corner 34 radar installed at the rear right side of vehicle 1.

In addition, the first corner radar 31 may have a detection area 31a facing the front left side, the second corner radar 32 may have a detection area 32a facing the front right side, and the third corner radar 33 may have a detection area 33a facing the rear left side, and the fourth corner radar 34 may have a detection area 34a facing the rear right side. Each corner radar 31 to 34 may include a transmitting antenna and a receiving antenna, and may be configured to obtain radar detection data of each detection area 31a to 34a.

Figure 4:
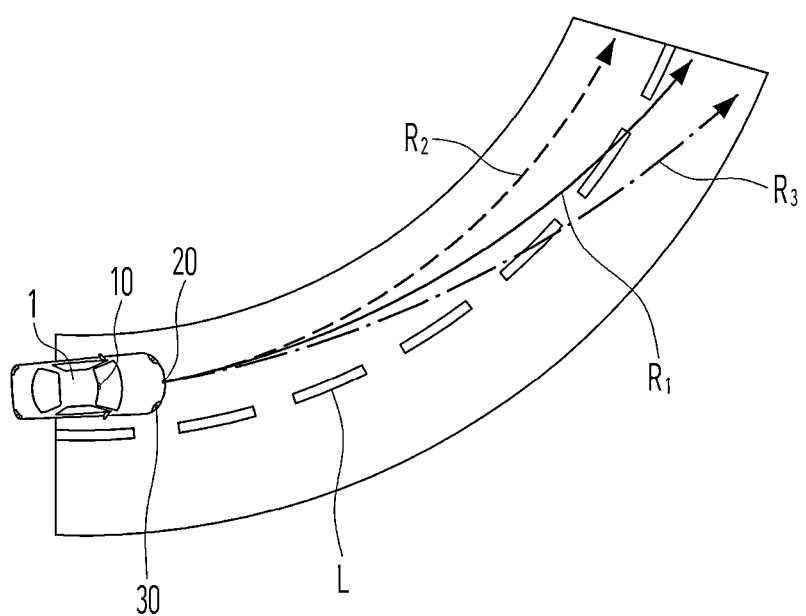
FIG. 4 is a diagram showing a method for generating a plurality of driving route candidates according to lane departure or lane center following on a curved road having a lane line in the method for assisting driving on failing the driver assistance function according to the embodiments of the present disclosure.

FIG. 4 is a diagram showing a method for generating a plurality of driving route candidates according to lane departure or lane center following on a curved road having a lane line in the method for assisting driving on failing the driver assistance function according to the embodiments of the present disclosure.

As described above, when the vehicle is driving on a curved road, even if there exist driving lane lines, if the curvature of the driving lane is very large, the lane keeping function may fail.

According to the embodiment of the present disclosure, when the lane keeping function fails, a plurality of driving route candidates may be generated. Specifically, as shown in FIG. 4, the driving route of the vehicle according to the steering angle at the time of failure of the lane keeping function (a first driving route candidate; $R_1$) and a driving route shifted to the left by a predetermined angle from the first driving route candidate (a second driving route candidate; $R_2$) and a driving route shifted to the right by a predetermined angle from the first driving route candidate (a third driving route candidate; $R_3$) may be generated as driving route candidates, respectively. Here, the predetermined angle may be approximately 1 degree to 2 degrees.

Subsequently, a driving risk determination may be performed for each driving route candidate. Specifically, it may be determined that the second driving route candidate $R_2$ is the driving route candidate for minimizing the driving risk, which is a driving route that prevents the vehicle 1 from departing form the lane by determining whether the vehicle 1 will depart from the lane L at a predetermined distance ahead using the front camera 10.

Accordingly, the driver may determine that driving along the second driving route candidate $R_2$ is an action for minimizing the risk, and if the driver does not take an appropriate response action (steering to the left), a leftward warning (alarm) may be issued and the steering assist according to the steering angle of the second driving route candidate $R_2$ may be performed.

Figure 5:
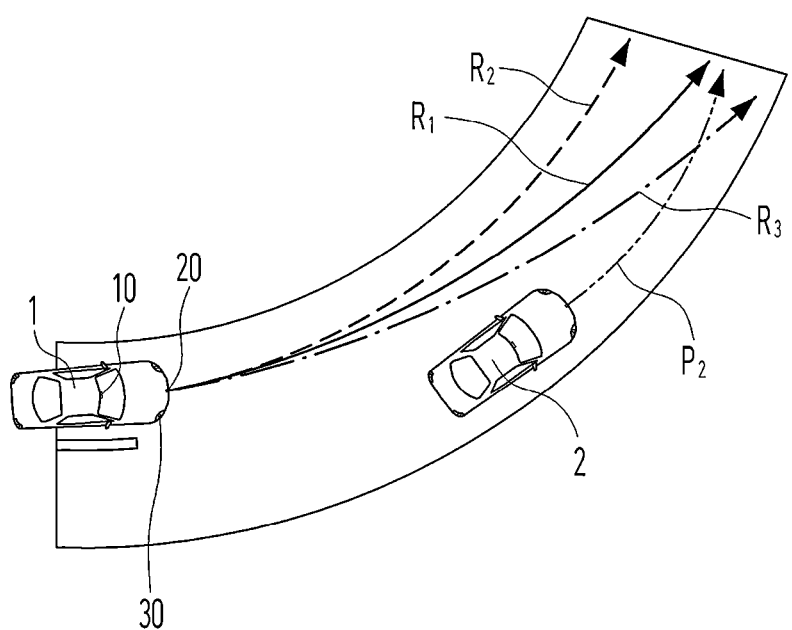
FIG. 5 is a diagram showing a method of generating a plurality of driving route candidates according to a collision risk with a peripheral vehicle on a curved road without a lane line in the method for assisting driving on failing the driver assistance function according to the embodiments of the present disclosure.

FIG. 5 is a diagram showing a method of generating a plurality of driving route candidates according to a collision risk with a peripheral vehicle on a curved road without a lane line in the method for assisting driving on failing the driver assistance function according to the embodiments of the present disclosure.

As shown in FIG. 5, the lane keeping function may fail if the lane is not recognized. Even in this case, when the lane keeping function fails, a plurality of driving route candidates may be generated based on the steering angle of the vehicle at the time of failure.

Meanwhile, if the lane line is not recognized, instead of determining the driving risk based on the lane line (e.g., determining whether or not to depart from the lane), the driving risk of the vehicle may be determined by the collision risk with the peripheral vehicle when the peripheral vehicle is driving.

Specifically, when the lane keeping function fails due to non-recognition of the lane line, a plurality of driving route candidates may be generated. As shown in FIG. 5, a driving route of the vehicle according to the steering angle at the time of failure of the lane keeping function of the vehicle 1 (a first driving path candidate; $R_1$), a driving route shifted to the left by a predetermined angle therefrom (a second driving route candidate; $R_2$) and a driving route shifted to the right by the predetermined angle therefrom (a third driving route candidate; $R_3$) may be generated as driving route candidates, respectively. Here, the predetermined angle may be approximately 1 degree to 2 degrees.

Subsequently, a driving risk determination may be performed for each driving route candidate. Specifically, the driving path $P_2$ of the peripheral vehicle 2 may be identified from the driving speed and driving direction of the peripheral vehicle 2, and the collision risk between the peripheral vehicle 2 and the host vehicle 1 may be determined for each driving route candidate of the host vehicle 1. Accordingly, it may be determined that the second driving route candidate $R_2$, which is a route that minimizes the collision risk, is a driving route candidate for minimizing the driving risk.

This driving risk determination may be performed using at least one of the front camera 10, the front radar 20, or the corner radar 30 installed at the vehicle.

In this way, by determining the driving route candidate that minimizes the driving risk, it may be determined that driving along the second driving route candidate $R_2$ is an action for minimizing the risk, and if the driver does not perform the appropriate action (steering to the left), a leftward warning and a steering assist according to the steering angle of the second driving route candidate $R_2$ may be performed.

Figure 6A:
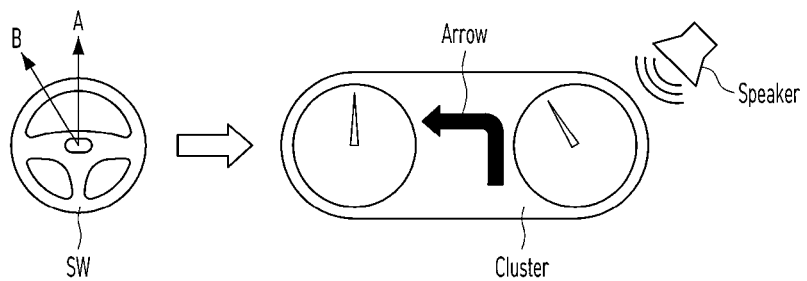
FIGS. 6A and 6B illustrate diagrams showing a warning method in the direction of minimizing the risk according to the method for assisting driving according to the embodiments of the present disclosure.
Figure 6B:
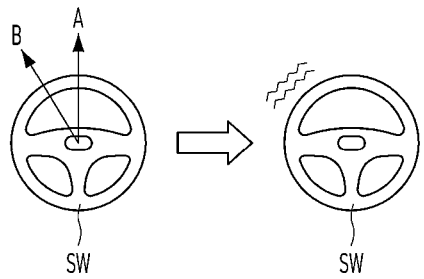

FIGS. 6A and 6B illustrate diagrams showing a warning method in the direction of minimizing the risk according to the method for assisting driving according to the embodiments of the present disclosure.

Referring to FIG. 6A, if driving according to the second driving route candidate $R_2$ minimizes the driving risk as in FIGS. 4 and 5 discussed above, for the steering wheel (SW) of the vehicle, the current steering direction may be set as direction A, and the steering direction that minimizes the risk may be set as direction B (The steering angle for minimizing the risk may be the angle between the direction A and the direction B).

Here, since turning the steering wheel to the left (counterclockwise) is the driver's appropriate action, if it is determined that the driver did not take the appropriate action to turn the steering wheel (SW) to the left (counterclockwise), the driving assistance method according to the embodiment of the present disclosure may provide a visual alarm (warning) or an audible alarm (warning).

Specifically, as shown in FIG. 6A, a visual alarm may be displayed as an arrow on the vehicle's cluster. Due to this visual alarm, the driver can immediately recognize the direction of the arrow and take appropriate action by turning the steering wheel in the direction of the arrow (to the left), which is the direction of minimizing the risk.

Meanwhile, FIG. 6A illustrates that an arrow is displayed on the cluster (or HMI; Human Machine Interface) as a visual alarm, but the present disclosure is not limited thereto. For example, a visual alarm may be issued by displaying an arrow on a Head Up Display (HDU) so that the driver can more easily recognize the arrow.

Further, in the case of an audible alarm, it may be an audible alarm from an opposite side. This is because when the left direction is the direction of minimizing the risk, a loud alarm sound may be heard from the speaker on the right side so that the driver can immediately recognize that there is a danger on the right side.

In addition, the visual alarm and the audible alarm may be performed selectively, but the present disclosure is not limited thereto, and the visual alarm and the audible alarm may be performed together.

Further, the alarm for the driver is not limited to a visual alarm or an audible alarm, and may be a haptic alarm as shown in FIG. 6B. Specifically, as shown in FIG. 6B, when turning the steering wheel to the left is an appropriate response action, a haptic alarm can be issued so that a left portion of the steering wheel (SW) vibrates to warn the driver. Additionally, this haptic alarm may be performed along with an audible alarm by a speaker.

Figure 7A:
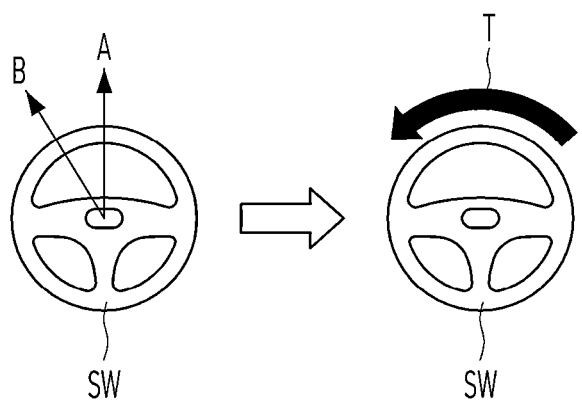
FIG. 7A is a diagram showing a steering assist method in the direction of minimizing the risk according to the method for assisting driving according to the embodiments of the present disclosure.
Figure 7B:
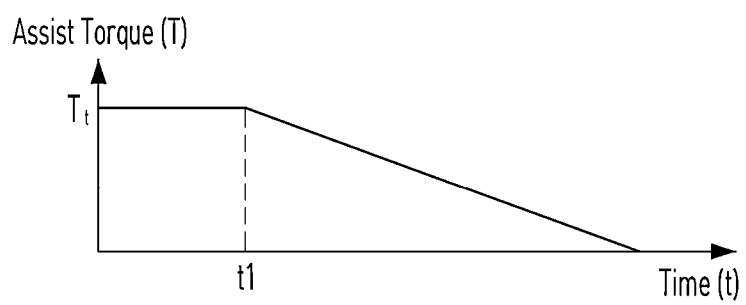
FIG. 7B is a graph showing changes in assist torque during the steering assist.

FIG. 7A is a diagram showing a steering assist method in the direction of minimizing the risk according to the method for assisting driving according to the embodiments of the present disclosure, and FIG. 7B is a graph showing changes in assist torque during the steering assist.

As shown in FIG. 7A, according to the embodiment of the present disclosure, after issuing a visual alarm or an audible alarm (or a haptic alarm), if driving in the left direction is an appropriate action of the driver, a steering assist may be performed so that the steering wheel (SW) rotates to the left direction (counterclockwise).

Meanwhile, the steering assist torque T at this time may be controlled not to be greater than a predetermined threshold value $T_t$ (see FIG. 7B). This is to prevent the assist torque from becoming greater than a predetermined threshold value because the steering assist in the present disclosure is not intended to completely control the driving, but to assist the driver in handing over the authority to the driver.

In addition, as shown in FIG. 7B, after the assist torque corresponding to the predetermined threshold value $T_t$ is applied for a predetermined time t1, the assist torque T may be gradually reduced. This is to smoothly hand over the authority to the driver by gradually reducing the role of the system after providing the steering assistance to avoid dangerous situations.

Figure 8:
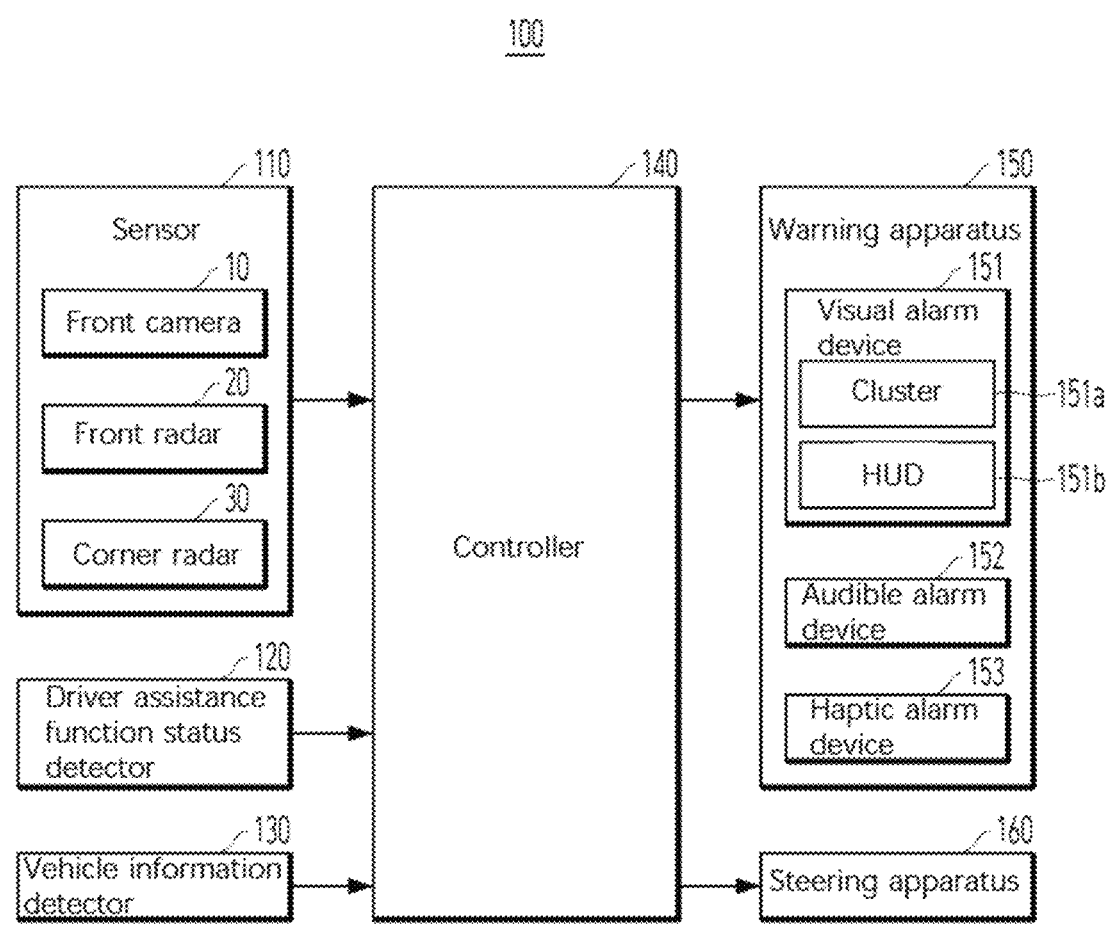
FIG. 8 is a control configuration diagram schematically showing the configuration of a system for assisting driving according to the embodiments of the present disclosure.

FIG. 8 is a control configuration diagram schematically showing the configuration of a system for assisting driving according to the embodiments of the present disclosure.

Referring to FIG. 8, the system for assisting driving 100 according to the embodiments of the present disclosure may include a sensor 110 configured to detect the surroundings of the vehicle, a driver assistance function status detector 120 configured to detect the status of the driver assistance function of the vehicle, and a vehicle information detector 130 configured to detect the body information of the vehicle.

Additionally, the system for assisting driving 100 according to the embodiments of the present disclosure may include a controller 140 configured to control to perform the driving assistance when a failure of the driver assistance function of the vehicle is detected. In addition, the system for assisting driving 100 according to the embodiments of the present disclosure may further include a warning apparatus 150 configured to warn the driver and a steering apparatus 160 configured to control the driving in the lateral direction of the vehicle.

The sensor 110 may include at least one of a front camera 10, a front radar 20, or a plurality of corner radars 30. However, it is not limited thereto, and the sensor 110 may include other types of sensors for detecting the surroundings of the vehicle, such as a LIDAR sensor or an ultrasonic sensor. The sensor 110 may detect lane lines around the vehicle, curvature of the road, etc. using the at least one sensor, and may also detect the location and the speed of peripheral vehicles.

The driver assistance function status detector 120 may detect whether a driver assistance function, for example, a lane keeping function, has failed. By notifying the controller 140 of the detection result of whether the driver assistance function has failed, the controller 140 may execute the method for assisting driving on failing the driver assistance function.

The vehicle information detector 130 may detect body information such as the speed and the steering angle of the vehicle. By detecting this body information, for example, when the lane keeping function fails, a plurality of driving route candidates may be generated, and the driving risk of the driving route candidates may be evaluated using the body information along with the information from the sensor 110.

The controller 140 according to the embodiments of the present disclosure may control the driving assistance to be performed when a failure of the driver assistance function of the vehicle is detected.

Specifically, the controller 140 may generate a plurality of driving route candidates based on the driving state when the driver assistance function fails, determine the driving risk of the vehicle for each of the plurality of driving route candidates, determine the driver's appropriate response action for minimizing the driving risk of the vehicle based on the driving risk for each of the plurality of driving route candidates, determine whether the driver took the appropriate response action, and perform the driving assistance in a direction of minimizing the driving risk if it is determined that the driver did not take the appropriate response action.

Since the method for assisting driving on failing the driver assistance function performed by the controller 140 was explained in detail previously, the detailed explanation will be omitted here.

On the other hand, the controller 140 according to the embodiments of the present disclosure may be connected to a warning apparatus 150 configured to warn the driver and a steering apparatus 160 configured to control the lateral movement of the vehicle.

Accordingly, the warning apparatus may provide a visual alarm, an audible alarm, or a haptic alarm in the direction of minimizing the driving risk of the vehicle, and an assist torque may be applied through the steering apparatus in the direction of minimizing the driving risk of the vehicle.

Specifically, the warning apparatus 150 may include a visual alarm device 151, and the visual alarm device 151 may include at least one of a vehicle cluster 151*a* or a head-up display 151*b*. The visual alarm device 151 may issue an alarm by displaying the steering direction of the driver that minimizes the driving risk of the vehicle on at least one of the cluster or the head-up display.

In addition, the warning apparatus 150 may include an audible alarm device 152, and the audible alarm device 152 may issue an alarm by generating a warning sound using an audible alarm device (e.g., a speaker) located in the opposite direction to the steering direction of the driver to minimize the driving risk of the vehicle.

In addition, the warning apparatus 150 may include a haptic alarm device 153, and the haptic alarm device 153 may issue an alarm by generating vibration on one side of the steering wheel corresponding to the direction of minimizing the driving risk of the vehicle.

Meanwhile, an assist torque may be applied to the steering apparatus 160 including the steering wheel by the control of the controller 140, and this assist torque may be applied in the direction that minimizes the driving risk of the vehicle.

This assist torque control can assist the driver's steering, and the controller 140 may control the assist torque to be gradually decreased over time after a predetermined torque application time elapses after the assist torque is initially applied. By doing so, it is possible to allow the driver to smoothly take over the authority without any discomfort.

According to the above-described embodiment of the present disclosure, in transferring authority to the driver when the driver assistance function fails in the vehicle equipped with the driver assistance system, it is possible to provide a method and system for assisting driving to prevent a dangerous situation for the driver in advance, and immediately cope with the risk.

Moreover, according to the method and system for assisting driving according to the embodiments of the present disclosure, when the driver assistance function fails, it is possible to promptly provide the driver with the direction to avoid risk so that the driver can respond immediately. In addition, it is possible to increase driving convenience by quickly canceling unnecessary alarms by the driver's appropriate response.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1: Vehicle (Host vehicle)
2: Peripheral vehicle
L: Lane line
$R_1$: First driving route candidate
$R_2$: Second driving route candidate
$R_3$: Third driving route candidate
$P_2$: Driving path of peripheral vehicle
10: Front camera
20: Front radar
30 (31~34): Corner radar
100: System for assisting driving
110: Sensor
120: Driver assistance function status detector
130: Vehicle information detector
140: Controller
150: Warning apparatus
151: Visual alarm device
152: Audible alarm device
153: Haptic alarm device
160: Steering apparatus

What is claimed is:

1. A method for assisting driving on failing a driver assistance function of a vehicle, comprising:
   detecting a failure of the driver assistance function;
   generating a plurality of driving route candidates based on a driving state when the driver assistance function fails;
   determining a driving risk of the vehicle for each of the plurality of driving route candidates;
   determining an appropriate response action of a driver for minimizing the driving risk of the vehicle, based on the driving risk for each of the plurality of driving route candidates;
   determining whether the driver took the appropriate response action; and
   performing a driving assistance in a direction of minimizing the driving risk of the vehicle if it is determined that the driver did not take the appropriate response action.

2. The method of claim 1, wherein the performing of the driving assistance comprises issuing a warning in the direction of minimizing the driving risk of the vehicle, and performing an assist control in the direction of minimizing the driving risk of the vehicle.

3. The method of claim 2, wherein the driver assistance function is a lane keeping function that assists the vehicle to maintain a driving lane, and
   wherein the generating of the plurality of driving route candidates comprises generating a plurality of driving route candidates comprising a first driving route candidate according to a steering angle of the vehicle on failing the lane keeping function, a second driving route candidate in which the steering angle is shifted to left by a predetermined angle from the first driving route candidate, and a third driving route candidate in which the steering angle is shifted to right by the predetermined angle from the first driving route candidate.

4. The method of claim 3, wherein the determining of the driving risk of the vehicle comprises determining the driving risk of the vehicle based on whether the vehicle is departed from a lane line of the driving lane or whether the vehicle is following a center of the driving lane if the lane line exists between the driving lane and an adjacent lane.

5. The method of claim 3, wherein the determining of the driving risk of the vehicle comprises determining the driving risk of the vehicle by determining a collision risk with a peripheral vehicle if there is no lane line between the driving lane of the vehicle and a lane in which the peripheral vehicle is driving.

6. The method of claim 3, wherein the warning in the direction of minimizing the driving risk of the vehicle is at least one of a visual warning or an audible warning.

7. The method of claim 6, wherein the visual warning is performed by displaying a steering direction of the driver for minimizing the driving risk of the vehicle on a cluster or a head-up display of the vehicle.

8. The method of claim 6, wherein the audible warning is performed by generating a warning sound from an opposite direction to a steering direction of the driver for minimizing the driving risk of the vehicle.

9. The method of claim 3, further comprising: after issuing the warning in the direction of minimizing the driving risk of the vehicle, determining whether the driver took the appropriate response action within a predetermined time, and
   wherein the assist control is performed if the driver did not perform the appropriate response action within the predetermined time.

10. The method of claim 9, wherein the predetermined time is set differently depending on the driving risk of the vehicle when the driver assistance function fails.

11. The method of claim 3, wherein the assist control is a steering assist control that rotates a steering wheel of the vehicle in the direction of minimizing the driving risk of the vehicle, and an assist torque during the steering assist control is set to be gradually decreased over time after a predetermined torque application time has elapsed after an initial assist torque is applied.

12. A system for assisting driving of a vehicle, comprising:
   a sensor configured to detect surroundings of the vehicle;
   a driver assistance function status detector configured to detect a status of a driver assistance function of the vehicle;
   a vehicle information detector configured to detect body information of the vehicle; and
   a controller configured to control to perform driving assistance when a failure of the driver assistance function of the vehicle is detected,
   wherein the controller is configured to: generate a plurality of driving route candidates based on a driving state when the driver assistance function fails; determine a driving risk of the vehicle for each of the plurality of driving route candidates; determine an appropriate response action of a driver for minimizing the driving risk of the vehicle, based on the driving risk for each of the plurality of driving route candidates; determine whether the driver took the appropriate response action; and perform a driving assistance in a direction of minimizing the driving risk of the vehicle if it is determined that the driver did not take the appropriate response action.

13. The system of claim 12, wherein the sensor the sensor comprises at least one of a front camera, a front radar, or a plurality of corner radars installed at the vehicle.

14. The system of claim 12, further comprising: a warning apparatus configured to warn the driver; and a steering apparatus configured to control a lateral movement of the vehicle, and wherein the driver assistance function is a lane keeping function that assists the vehicle to maintain a driving lane.

15. The system of claim 14, wherein the warning apparatus is configured to perform the driving assistance by performing at least one of a visual alarm, an audible alarm, or a haptic alarm in the direction of minimizing the driving risk of the vehicle.

16. The system of claim 15, wherein the warning apparatus comprises a visual alarm device and the visual alarm device comprises at least one of a cluster or a head-up display, and wherein the visual alarm is performed by displaying a steering direction of the driver for minimizing the driving risk of the vehicle on at least one of the cluster or the head-up display.

17. The system of claim 15, wherein the warning apparatus comprises an audible alarm device, and the auditory alarm is performed by generating a warning sound by the audible alarm device located in an opposite direction to a steering direction of the driver for minimizing the driving risk of the vehicle.

18. The system of claim 15, wherein the warning apparatus comprises a haptic alarm device, and the haptic alarm is performed by generating vibration on one side of a steering wheel corresponding to the direction of minimizing the driving risk of the vehicle.

19. The system of claim 15, wherein the controller is configured to perform control so that an assist torque is applied to the steering apparatus, and the assist torque is applied in the direction of minimizing the driving risk of the vehicle.

20. The system of claim 19, wherein the controller is configured to control the assist torque to be gradually decreased over time after a predetermined torque application time has elapsed after an initial assist torque is applied.

* * * * *